Feb. 26, 1952     J. D. SEAVER     2,587,391
THERMOCOUPLE
Filed June 10, 1949
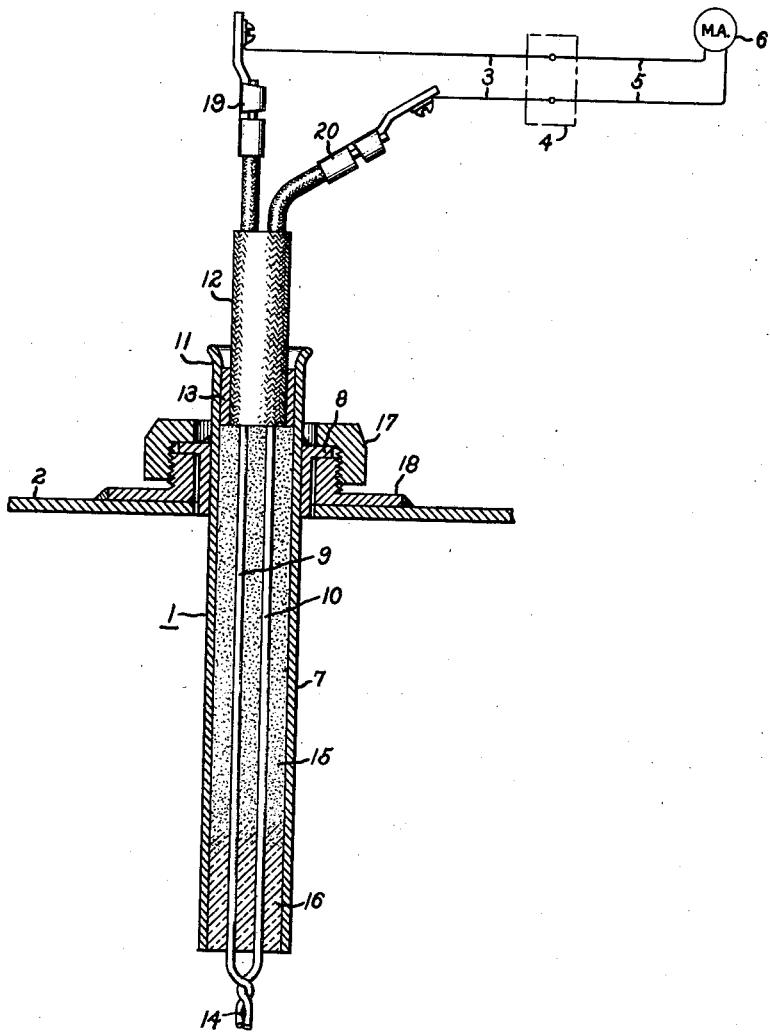
Inventor:
John D. Seaver,
by    Crowell F. Mack
His Attorney.

Patented Feb. 26, 1952

2,587,391

UNITED STATES PATENT OFFICE 2,587,391

THERMOCOUPLE

John D. Seaver, Marblehead, Mass., assignor to General Electric Company, a corporation of New York Application June 10, 1949, Serial No. 98,210

3 Claims. (Cl. 136—4)

My invention relates to improvements in thermocouples for measuring temperatures of fluids and has particular reference to thermocouples for thermal power plant installations involving severe vibration.

In measuring the exhaust gas temperatures of aircraft gas turbine power plants high temperatures and extreme vibrations are encountered which require very ruggedly constructed temperature indicators. Sheathed thermocouples mounted on the gas turbine exhaust housing and extending into the gas stream have been found the most satisfactory means for indicating the exhaust temperatures, which may run in the vicinity of several hundred degrees centigrade. However, mechanical failures have generally occurred after a few hours operation due to the effects of the turbine vibrations. In some exhaust housing installations of this type vibration problems are especially severe, since turbine speeds of 10,000 revolutions per minute are involved, and the thermocouple assembly may be subjected to forces associated with vibrational acceleration up to 20,000 times that of gravity.

In the usual type of installation where a tubular metallic housing sheathes a solid ceramic core carrying the thermocouple conductors, that part of the thermocouple assembly extending within the exhaust housing vibrates so as to fracture the ceramic core, usually near the point where the assembly is fixed to the exhaust housing. Deterioration of the cement or other means commonly used to seal the core within the housing due to the high temperatures involved results in vibrational displacement of the ceramic core and gas leakage through the thermocouple. This displacement of the broken ceramic core abrades the thermocouple conductors and may saw them in two. Similarly, vibration of the thermocouple junction, which extends beyond the end of the thermocouple housing, may also subject the thermocouple conductors to abrasion by the ceramic core or by the end of the tubular housing.

While these problems are intensified in gas turbine power plant installations, similar problems arise in the use of thermocouples in reciprocating internal combustion engines and other installations where high gas temperatures are measured under extreme vibration conditions.

It is an object of my invention to provide an improved thermocouple for measuring fluid temperatures which is capable of long service under extreme vibration conditions.

According to my invention, I provide in a thermocouple of the nature described a core made of a powdered insulating material within the tubular thermocouple housing and surrounding the spaced thermocouple conductors. One end of the housing is closed by the terminal provisions for a thermocouple cable and the junction end is sealed by an insulating plug. A refractory insulating powder is firmly packed within the remainder of the housing and surrounds the thermocouple conductors. To form the confining plug a cementitious powder having a relatively low melting temperature is mixed with the refractory powder so that the powdered mixture within a portion of the housing adjacent the thermocouple junction may be solidified by heating it to a sufficient temperature. The confining plug seals the thermocouple gas tight and avoids the necessity of cementing a conventional solid core in place within the housing. Within the portion of the housing intermediate its ends the insulating material, while firmly packed, remains in a powdered state so that it is not subject to breakage as is a conventional ceramic core and hence has no appreciable abrasive effect on the thermocouple conductors. An alternative method of forming the insulating plug without employing a cement or binder is to solidly pack the refractory powder in the junction end of the housing, which is accomplished by swaging or otherwise working the metallic housing to reduce its volume. Thermocouples constructed according to my invention have operated satisfactorily for more than 40 hours under the vibration and temperature conditions encountered in an air craft gas turbine tailcone installations, whereas a maximum life of 10 hours may be expected for the usual type of thermocouple in a similar installation.

Another feature of my invention is the application of a protective coating to one of the thermocouple conductors. For thermocouple applications where temperatures up to 1000° C. are encountered a nickel-aluminum alloy is commonly used as one of the junction metals, the other usually being a nickel-chromium alloy. The minute traces of sulphur usually present in the powder in which the conductors are embedded or in the fuels commonly used in gas turbines are sufficient to cause intergranular penetration of the nickel-aluminum alloy and so embrittles it that breakage may result under vibration conditions. By coating the nickel-aluminum conductor with chromium, this effect is avoided and the useful life of the thermocouple junction is extended to be consistent with the life of the remainder of a thermocouple assembly constructed according to my invention.

For additional objects and advantages, and for a better understanding of the invention, attention is now directed to the following description and accompanying drawing, and also to the appended claims in which the features of the invention believed to be novel are particularly pointed out. In the drawing, the single figure shows a thermocouple assembly embodying my invention.

As shown in the drawing, the thermocouple assembly 1 is installed by mounting it through an aperture in a housing wall 2 of a gas turbine power plant or of any chamber confining a fluid to be tested. To the thermocouple terminals are connected a pair of conductors 3 of corresponding metals which are connected at a reference junction 4 to a pair of copper or other suitable conductors 5 leading to a milliammeter 6. The reference junction 4 is usually in any location protected from the high power plant temperatures, although an ice point or other exactly determined reference temperature may be used for greater accuracy. Similarly, while the indicating instrument 6 customarily employed is a milliammeter having a temperature scale calibration, more accurate means, such as a potentiometer, may be employed.

The thermocouple asesmbly has a tubular housing or sheath 7 made of stainless steel or other suitable metal to which is externally attached a metallic mounting flange 8 near the terminal end of the housing, the flange being preferably welded to the housing. Extending through the housing bore are a pair of thermocouple conductors 9 and 10 of dissimilar metals which are integrally connected to the conductors of corresponding metals in a cable 12 having an insulating cover of suitable material, such as woven glass fibers. The conductors may be very simply prepared for assembly by stripping the insulating cover from an end portion of the cable 12. The alloys preferably used in conductors 9 and 10, respctively, and which are commonly employed in thermocouple pyrometry where temperatures up to 1000° C. are to be measured, are a nickel-chromium alloy consisting, for example, of 90% nickel and 10% chromium, and a nickel-aluminum alloy which may also contain small amounts of manganese and silicon and consisting, for example, of 95% nickel, 2% aluminum, 2% manganese, and 1% silicon.

The terminal end of the housing 7 is outwardly flared, as shown at 11, to protect the insulated thermocouple cable 12 from sharp edges on the housing end. To connect the thermocouple cable 12 to the housing 7, a bushing 13 made of brass or other malleable metal is provided, the external diameter of the bushing being the same as or slightly larger than the internal diameter of the housing 7 so that a very tight fit is provided when the bushing is inserted in the terminal end of the housing beyond the flare 11. The internal diameter of the bushing is slightly smaller than the cable diameter so that it grips the thermocouple cable firmly without cutting its insulating cover. At the other end of the housing the protruding ends of the thermocouple conductors 10 and 11 are connected together, preferably by welding, to form a thermocouple junction 14.

The thermocouple conductors are insulated from each other and from the housing walls by an insulating core consisting principally of a refractory insulating powder 15 such as alumina or magnesia, to which a small amount of cementitious powder may be added, as will be described in another paragraph. The powder is preferably rammed into place from the open end of the housing around the junction. To provide a volume of relatively soft powder in the region of maximum bending moment near the mounting flange 8, a comparatively large charge of powder is placed in the tubing adjacent the bushing 13 and in the vicinity of the flange 8 before any packing takes place, followed by successively smaller charges of powder which are each tamped in place. With the housing packed in this preferred manner, the powder is least firm where the thermocouple housing is subjected to the greatest bending, thus allowing the powder to work around the thermocouple conductors with less restraint. In this vicinity, the thermal conductivity of the less firmly packed powder is also lower so as to help protect the insulating cover on the thermocouple cable 12 from excessive heating. Towards the free end of the thermocouple housing, the powder is packed more firmly for greater durability.

In order to prevent the powdered core material from flaking off or decomposing at the junction end of the thermocouple housing, a confining means comprising a core plug 16 is employed to seal the junction end. Preferably, a small amount of relatively low melting cementitious material is first mixed with the refractory powder 15, as is done in making some refractory cements. When the powdered mixture is packed in the housing and the end of the housing suitably heated, the cementitious material fuses and binds the refractory material to form a solid plug. The cementitious binder may suitably consist, for example, of a small percentage of clay, glass forming substances, or other materials, so long as they do not fuse at the temperatures encountered in the thermocouple installation nor require so high a fusing temperature as to injure the thermocouple housing or conductors when the plug is formed. A plug as formed in this preferred manner extends for a suitable distance from the junction end of the housing, one-fourth of the length of the housing being satisfactory, leaving the remainder of the refractory cement in a powdered state.

The refractory powder material 15 may also be hardened to form a confining plug portion 16 without addition of a cementitious material by more firmly compacting the powder. This may be accomplished by packing a refractory material, preferably magnesia, in the housing, temporarily closing off the junction end of the housing, and swaging or otherwise working the junction end portion of the housing to reduce its volume. Under the high pressures thus applied, the refractory material in the junction end portion of the housing becomes a hard solid mass in which conductors 9 and 10 are firmly embedded. The refractory material in the remainder of the housing still remains in a powdered state to effect the advantages previously mentioned.

To match the life of a thermocouple junction with that of the improved thermocouple struture made according to my invention, I have found that the life of the thermocouple conductor 10, which is composed of the nickel-aluminum alloy, may be greatly increased by coating the portion of that conductor extending through the thermocouple housing with chromium. Otherwise, the traces of sulphur, which are usually present in the refractory cement or in the fuels used in gas turbine power plants, cause intergranular penetration of the nickel and aluminum in the alloy so as to embrittle it and result in breakage of the conductor due to vibration in a relatively short period. The conductor is preferably coated by electrolytic deposition, but other suitable means may be employed.

The thermocouple is installed in the usual manner by inserting it in the wall 2 of a chamber confining the combustion gas or other fluid to be tested. In a typical installation as shown in the drawing, a nut 17 having an internal annular flange which bears against the flange 8 of the thermocouple assembly is threaded over an externally threaded member 18 which is in turn welded to the chamber wall 2 in a gas tight relation. Terminals 19 and 20 are provided on the ends of the conductors in the cable 12 to provide appropriate connections to the thermocouple circuit.

In operation, the mechanical difficulties heretofore encountered by a breakage of a solid cermaic core are avoided. Despite the whipping of the free junction end of the thermocouple housing due to vibration of the chamber wall 2 and the consequent tendency of the housing to bend at the mounting point, no damage is done to the couple because the insulating material is powered and cannot break, as would a solid core, to allow shattered core portions to abrade the thermocouple conductors. Adjacent the thermocouple junction, where the bending moment is small, the insulating material is a solid plug and adheres to the housing wall to form a gas tight seal and effectively prevent longitudinal displacement of the conductors.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A thermocouple for measuring fluid temperatures comprising a tubular metallic housing, means thereon for mounting said housing on an apertured chamber wall in a gas-tight relation, a pair of conductors of dissimilar metals extending through said housing, an insulating cover surrounding said conductors at one end of said housing, means for clamping said insulated portions of said conductors within said end, a refractory insulating powder containing an amount of powered cementitious material packed around said thermocouple conductors and filling the remainder of said housing, said cementitious material being fused to form with the refractory powder a solid plug extending between said housing and said conductors only in a region adjacent the other end of said housing, and a thermocouple junction comprising the ends of said pair of conductors extending from said plug.

2. A thermocouple for measuring fluid temperatures comprising a tubular metallic housing, a pair of conductors of dissimilar metals extending through said housing, an insulating cover surrounding said conductors at one end of said housing, an insulating powder packed around the remaining portions of said thermocouple conductors within said housing and filling the remainder of said housing, said powder being progressively more firmly packed along the length of the housing from said insulated portion of said conductors to the other end of said housing, a hardened portion of said powder forming a solid plug extending between said housing and said conductors only in a region adjacent said other end of said housing, and a thermocouple junction comprising the ends of said pair of conductors extending from said hardened portion.

3. A thermocouple for measuring fluid temperatures of gases confined by a chamber wall comprising a tubular metallic housing which partially extends into said chamber, means on said housing for mounting it on said chamber wall in a gas-tight relation, a pair of conductors of dissimilar metals extending through said housing, an insulating cover surrounding said conductors at one end of said housing, means for clamping said insulated portions of said conductors within said housing end, a refractory insulating powder containing a powdered cementitious material packed around the remaining portions of said thermocouple conductors within said housing, said powder being progressively more firmly packed along the length of the housing from said insulated portion of said conductors to the other end of said housing, said cementitious material being fused to form with the refractory powder a solid plug between said housing and said conductors only in a region adjacent said other end of said housing, and a thermocouple junction comprising the ends of said pair of conductors extending from said plug.

JOHN D. SEAVER.

REFERENCES CITED

The following references are of record in the file of this patent:

UNITED STATES PATENTS

| Number | Name | Date |
|---|---|---|
| 928,089 | Vokel | July 13, 1909 |
| 1,279,252 | Capp | Sept. 17, 1918 |
| 1,422,672 | Coghlan | July 11, 1922 |
| 1,664,720 | Woodruff | Apr. 3, 1928 |
| 2,156,853 | Huggins | May 2, 1939 |
| 2,223,408 | Dietert | Dec. 3, 1940 |
| 2,341,235 | Palmer | Feb. 8, 1944 |
| 2,445,159 | Tegge | July 13, 1948 |
| 2,480,557 | Cummins | Aug. 30, 1949 |
| 2,527,890 | Pouchnik et al. | Oct. 31, 1950 |

FOREIGN PATENTS

| Number | Country | Date |
|---|---|---|
| 190,657 | Great Britain | Dec. 28, 1922 |